United States Patent
Morita et al.

(10) Patent No.: US 7,522,175 B2
(45) Date of Patent: Apr. 21, 2009

(54) WORKFLOW ENGINE BASED DYNAMIC MODIFICATION OF IMAGE PROCESSING AND PRESENTATION IN PACS

(75) Inventors: Mark M. Morita, Arlington Heights, IL (US); Prakash Mahesh, Schaumburg, IL (US); Thomas A. Gentles, Algonquin, IL (US)

(73) Assignee: General Electric Company, Schenectady, NY (US)

( * ) Notice: Subject to any disclaimer, the term of this patent is extended or adjusted under 35 U.S.C. 154(b) by 601 days.

(21) Appl. No.: 10/997,552

(22) Filed: Nov. 23, 2004

(65) Prior Publication Data

US 2006/0109500 A1    May 25, 2006

(51) Int. Cl.
G09G 5/00        (2006.01)
(52) U.S. Cl. .................. 345/619; 382/128; 715/745; 715/765
(58) Field of Classification Search ............ 345/419, 345/619; 707/1, 10; 715/854, 745, 764; 382/128
See application file for complete search history.

(56) References Cited

U.S. PATENT DOCUMENTS

| | | | |
|---|---|---|---|
| 5,774,661 A | 6/1998 | Chatterjee et al. | |
| 5,781,247 A * | 7/1998 | Wehmeyer et al. | 348/569 |
| 5,821,936 A * | 10/1998 | Shaffer et al. | 715/810 |
| 6,243,095 B1 * | 6/2001 | Shile et al. | 715/854 |
| 6,498,613 B1 * | 12/2002 | Wajima | 715/775 |
| 6,546,364 B1 | 4/2003 | Smirnov et al. | |
| 6,574,629 B1 * | 6/2003 | Cooke et al. | 707/10 |
| 6,707,476 B1 * | 3/2004 | Hochstedler | 715/789 |
| 2002/0052851 A1 * | 5/2002 | Berman | 705/64 |
| 2002/0055917 A1 * | 5/2002 | Muraca | 707/1 |
| 2002/0101436 A1 * | 8/2002 | Shastri et al. | 345/619 |
| 2003/0187689 A1 * | 10/2003 | Barnes et al. | 705/2 |
| 2004/0202387 A1 * | 10/2004 | Yngvesson | 382/305 |
| 2005/0021472 A1 * | 1/2005 | Gettman et al. | 705/52 |
| 2005/0025349 A1 * | 2/2005 | Crewe | 382/128 |
| 2005/0110788 A1 * | 5/2005 | Turner et al. | 345/419 |

* cited by examiner

*Primary Examiner*—Kee M Tung
*Assistant Examiner*—Michelle K Lay
(74) *Attorney, Agent, or Firm*—McAndrews, Held & malloy, Ltd.; Peter J. Vogel; Michael A. Dellapenna

(57) ABSTRACT

The present invention provides a computer-readable storage medium including a set of instructions for a computer. The instructions include an access routine, a tracking routine, and a modifying routine. The access routine is configured to communicate a default image processing workflow between a network server and a display workstation. The default image processing workflow includes at least one default image processing step for preparing at least one image for presentation to a user. The tracking routine is configured to monitor a selection of at least one additional image processing step to be applied to the image. The modifying routine is configured to modify the default workflow to alter the default workflow and/or add the at least one additional image processing step to the default image processing workflow.

27 Claims, 4 Drawing Sheets

FIG. 5

WORKFLOW ENGINE BASED DYNAMIC MODIFICATION OF IMAGE PROCESSING AND PRESENTATION IN PACS

RELATED APPLICATIONS

Not applicable.

FEDERALLY SPONSORED RESEARCH OR DEVELOPMENT

Not applicable.

BACKGROUND OF THE INVENTION

The present invention generally relates to an improvement in workflow development for image processing. Specifically, the present invention relates to workflow engine-based dynamic modification of image processing and presentation in a picture archiving and communication system.

Picture archiving and communication systems ("PACS") connect to medical diagnostic imaging devices and employ an acquisition gateway (between the acquisition device and the PACS), storage and archiving units, display workstations, databases, and sophisticated data processors. These components are integrated together by a communication network and data management system. A PACS has, in general, the overall goals of streamlining health-care operations, facilitating distributed remote examination and diagnosis, and improving patient care.

A typical application of a PACS system is to provide one or more medical images for examination by a medical professional. For example, a PACS system can provide a series of x-ray images to a display workstation where the images are displayed for a radiologist to perform a diagnostic examination. Based on the presentation of these images, the radiologist can provide a diagnosis. For example, the radiologist can diagnose a tumor or lesion in x-ray images of a patient's lungs.

However, before a user is able to view images on a display workstation, the images may undergo preprocessing and processing. In other words, preprocessing and processing functions are applied to images before a user views the images. For example, when raw image data (image data that is received from an imaging modality and has not undergone any preprocessing or processing) is initially received by a PACS system, one or more preprocessing functions are applied to the raw image data. Typically, the preprocessing functions applied to raw image data are modality-specific enhancements. Modality-specific enhancements can include, for example, contrast or frequency compensation functions specific to a particular x-ray imaging device. For example, contrast preprocessing functions may be characterized by the following parameters: GT (contrast type), GA (rotation amount of GT curve), GC (rotation center for GT), and GS (density shift, the amount of shifting applied to GT). The frequency preprocessing functions may be characterized by the following parameters: RN (frequency rank), RE (frequency enhancement), and RT (frequency type). Each preprocessing function may represent a linear or non-linear function, function modification, or function parameter. The preprocessing functions may be applied to raw image data any time prior to the image processing and display.

The preprocessing functions may be selected based, for example, on an anatomical region to which the raw image data corresponds. In other words, the preprocessing functions selected may vary depending on whether the raw image data represents, as examples, the head, neck, chest, abdomen, breast, lungs, pelvis, or shoulders. The preprocessing functions may vary for each anatomical region due to the differences in tissue, bone, and blood vessel density and prevalence.

Once the image data has been preprocessed, a user can access the image data from a display workstation. However, the user may desire to apply additional processing functions to the image data. The user may want to apply additional processing functions to the image data in order to optimize the images to the user's preferred confidence level for making an accurate diagnosis. For example, the user may wish to flip an image, zoom into a portion of an image, pan across an image, adjust a window and/or level in an image, or adjust a brightness and/or contrast of an image based on his or her own preferences.

PACS systems attempt to prepare images for viewing by users by applying a series of processing steps or functions included in a Default Display Protocol ("DDP"). A DDP is a default workflow that applies a series of image processing functions to image data to prepare the image data for presentation to a user. DDPs typically include processing steps or functions that are applied before any diagnostic examination of the images. A DDP may be based on a type of imaging modality used to obtain the image data, for example. In general, a DDP attempts to present image data in a manner most useful to many users.

However, a user may wish to alter the processing steps in a DDP or add additional processing steps to a DDP. For example, a user may wish to apply additional processing steps to image data in order to enhance one or more features in the image. The user must manually select the processing steps and alter or apply them to the image data. The manual selection of processing steps takes up a considerable amount of time. In current PACS systems, for example, radiologists spend a majority of their time within an examination manually processing the images (for example, by flipping, zooming, panning, adjusting a window/level setting and/or a brightness/contrast setting). Even with the DDPs that may establish initial viewport settings and window/level presets, for example, radiologists typically must still process the images to optimize them to the radiologists' preferred confidence levels for making an accurate diagnosis. In addition, frequently radiologists apply the same processing functions to similar image data. For example, a radiologist may always apply a particular processing function to image data obtained from a certain imaging modality.

With increasing volumes of examinations and images, a reduction of radiologists and mounting pressures on improved productivity, radiologists are in dire need of image processing workflow enhancements that alleviate rote, repetitive tasks. Such enhancements can include the dynamic modification of DDPs so as to incorporate processing functions routinely selected by a radiologist, for example. In other words, an improvement could be DDPs that can be modified to incorporate a processing function frequently selected by a given radiologist for a certain type of image, for example. The modified DDP could then automatically process subsequent image data according to the processing functions routinely selected by the radiologist. The radiologist would not have to manually select the addition of processing steps as they have been incorporated into the DDP.

As such, these enhancements would allow radiologists to more quickly obtain images that are automatically processed to their individual preferences. By providing images that are automatically processed to a user's preferences, the user may then focus the majority of their time on the primary task of diagnosis. However, current PACS systems do not provide for such enhancements.

Therefore, a need exists for the dynamic modification of workflow engine-based image processing and presentation in PACS. Such dynamic modification can allow for the repeated updating of a default image processing workflow (such as a DDP, for example) according to processing steps or functions that are repeatedly selected by one or more users, for example. As described above, by dynamically modifying default image processing workflows, users can spend less of their time repeatedly selecting the same processing steps and more of their time providing diagnosis.

BRIEF SUMMARY OF THE INVENTION

The present invention provides a computer-readable storage medium including a set of instructions for a computer. The instructions include an access routine, a tracking routine, and a modifying routine. The access routine is configured to communicate a default image processing workflow between a network server and a display workstation. The default image processing workflow includes at least one default image processing step for preparing at least one image for presentation to a user at the display workstation. The tracking routine is configured to monitor a selection of at least one additional image processing step to be applied to the image at the display workstation. The modifying routine is configured to modify the default image processing workflow to alter at least one of the default image processing steps of the default image processing workflow and/or add at least one additional image processing step to the default image processing workflow.

The present invention also provides a method for dynamically altering an image processing workflow. The method includes providing access to a default image processing workflow, providing a tracking system capable of monitoring a selection of one or more additional image processing steps by a user and applied to an image, and providing a workflow editor capable of dynamically creating a modified default image processing workflow. The default image processing workflow includes a plurality of image processing steps for presenting a medical image for a diagnostic examination. The modified default image processing workflow includes the default image processing workflow and at least one modification. The modification is based on the selection of one or more additional image processing steps applied to the image.

The present invention also provides a system for dynamically altering an image processing workflow. The system includes a default image processing workflow including a subset of a plurality of image processing steps, a tracking system configured to monitor a user's selection of one or more of the plurality of image processing steps, and a workflow editor configured to modify the default image processing workflow to include one or more of the image processing steps selected by the user. The image processing steps are employed in presenting an image for a medical examination. The user selects the image processing step to be applied to the image after the subset of image processing steps have been applied to the image.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 1:
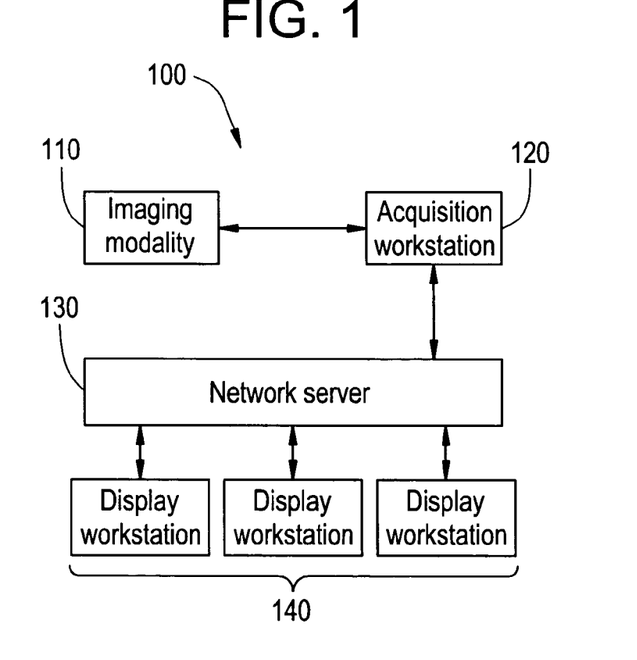
FIG. 1 illustrates an exemplary PACS system in accordance with an embodiment of the present invention.

FIG. 1 illustrates an exemplary PACS system 100 in accordance with an embodiment of the present invention. PACS system 100 includes an imaging modality 110, an acquisition workstation 120, a network server 130, and one or more display workstations 140. System 100 can include any number of imaging modalities 110, acquisition workstations 120, network servers 130 and display workstations 140 and is not in any way limited to the embodiment of system 100 as illustrated in FIG. 1.

In operation, imaging modality 110 obtains one or more images of a patient anatomy. Imaging modality 110 can include any device capable of capturing an image of a patient anatomy such as a medical diagnostic imaging device. For example, imaging modality 110 can include an X-ray imager, ultrasound scanner, magnetic resonance imager, or the like. Image data representative of the image(s) is communicated between imaging modality 110 and acquisition workstation 120. The image data can be communicated electronically over a wired or wireless connection.

Acquisition workstation 120 may apply one or more preprocessing functions to the image data in order to prepare the image for viewing on a display workstation 140. For example, acquisition workstation 120 may convert raw image data into a DICOM standard format or attach a DICOM header. The preprocessing functions are characterized in that they are modality specific enhancements (for example, contrast or frequency compensation functions specific to a particular X-ray imaging device, for example) applied at the beginning of the imaging and display chain.

The image data may then be communicated between acquisition workstation 120 and network server 130. The image data can be communicated electronically over a wired or wireless connection.

Network server 130 can include a computer-readable storage medium suitable for storing the image data for later retrieval and viewing at a display workstation 140. Network server 130 can also include one or more software applications for additional processing and/or preprocessing of the image data by one or more display workstations 140, as described below.

One or more display workstations 140 are capable of or configured to communicate with server 130. Display workstations 140 can include a general purpose processing circuit, a network server 130 interface, a software memory, and an image display monitor. The network server 130 interface may be implemented as a network card connecting to a TCP/IP based network, but may also be implemented as a parallel port interface, for example.

Display workstations 140 may retrieve or receive image data from server 130 for display to one or more users. For example, a display workstation 140 may retrieve or receive image data representative of a computed radiography ("CR") image of a patient's chest. A radiologist may then examine the image as displayed on a display device for any objects of interest such as, for example, tumors, lesions, etc.

Display workstations 140 may also be capable of or configured to apply processing functions to image data. For example, a user may desire to apply processing functions to enhance features within an image representative of the image data. Such processing functions can include any software-based application that may alter a visual appearance or representation of image data. For example, a processing function can include any one or more of flipping an image, zooming in an image, panning across an image, altering a window and/or level setting in a representation of the image data, and altering a contrast and/or brightness setting in a representation of the image data.

Display workstations 140 are also capable of or configured to retrieve and/or receive one or more default image processing workflows or DDP from server 130. For example, a default image processing workflow may be communicated to display workstation 140 from server 130. The default workflow may be used to apply one or more image processing functions to image data, for example. A default workflow may be communicated between server 130 and a display workstation 140 over a wired or wireless connection, for example.

In general, a default image processing workflow includes a sequence of one or more image processing functions are applied to image data. The default workflow generally includes processing steps that prepare an image for a diagnostic examination performed by a user.

Server 130 may store a plurality of default image processing workflows. The selection of a particular default workflow may be based on any number of relevant factors. For example, the type of default workflow used for a given image may be based on one or more of a type of imaging modality 110 used to obtain the image data, a type of examination that a user wishes to perform on the image, a type of patient anatomy featured in the image, and/or an identity of a user. The identity of a user may be used to determine which default workflow is applied to image data by attributing one or more default workflows with a user's login and/or password combination. For example, a user may have a preferred default workflow. The user may access his or her preferred default workflow by logging on to server 130 through a display workstation 140. Server 130 (or a set of instructions stored on computer-readable media known to those of ordinary skill in the art) may then determine which default workflow is associated with the user's login and/or password combination, for example. Based on this association, server 130 may then communicate the default workflow to the display workstation 140 that the user is logged into.

Figure 2:
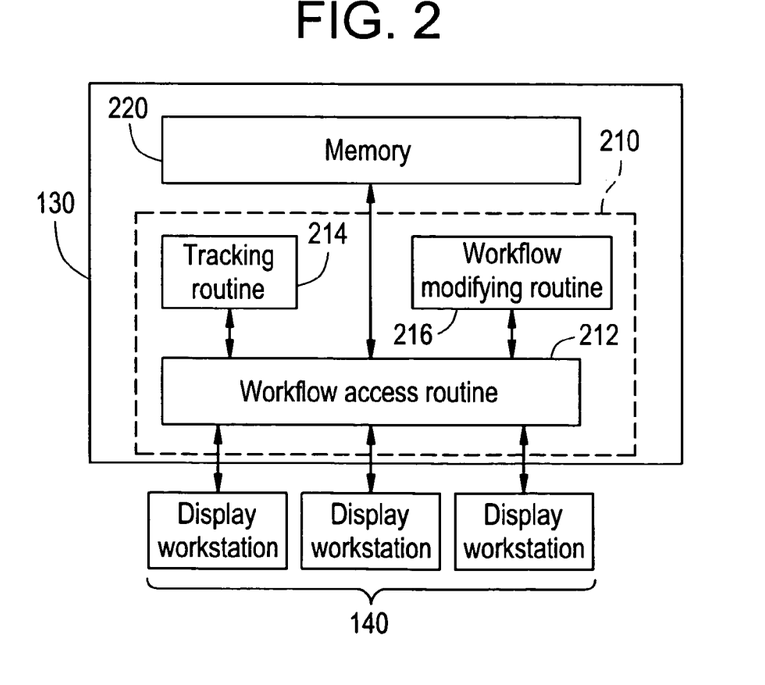
FIG. 2 illustrates a network server in accordance with an embodiment of the present invention.

FIG. 2 illustrates network server 130 in accordance with an embodiment of the present invention. Network server 130 includes a computer-readable storage medium 210 and a memory 220. Storage medium 210 includes a set of instructions for a computer. The instructions may be embodied in a software application that is stored on storage medium 210, for example. The instructions include a workflow access routine 212, a tracking routine or device 214, and a workflow modifying routine 216. Memory 220 includes any computer-readable storage medium. Memory 220 may be used to store any one or more of image data, default image processing workflows, image processing functions, or any other type of information that may be stored on computer-readable media. While server 130 is illustrated with only one memory 220, in accordance with the present invention, server 130 may include any number of memories 220. For example, server 130 may include a plurality of memories 220, each dedicated to the storage of a different type of data.

In operation, a user (such as a radiologist, for example) retrieves or receives a default image processing workflow from memory 220 by accessing workflow access routine 212 from a display workstation 140. As described above, communication between server 130 and display workstation 140 may occur over a network. For example, a user may log onto a display workstation 140 and connect the display workstation 140 to server 130 (and therefore workflow access routine 212) for communication of a default image processing routine between server 130 and workstation 140.

Once display workstation 140 is connected to server 130, the user may manually select a default image processing workflow from a list graphically displayed on display workstation 140. Once the user has made his or her selection, workflow access routine 212 may retrieve the selected default image processing workflow from memory 220.

In another embodiment of the present invention, a default image processing workflow is automatically retrieved by workflow access routine 212 based on one or more relevant factors such as, for example, the imaging modality from which the image data was obtained, a type of diagnostic examination to be performed on the image data, an anatomy featured in the image, and/or an identity of a user. For example, a user may employ a login/password combination to access image data and/or workflow access routine 212. Based on this login/password, workflow access routine 212 may communicate a particular default image processing workflow. Thus, a user may have a preferred or customized default image processing workflow. By associating this default workflow with the user's identity, system 100 may provide for the automatic communication of a preferred or customized default image processing workflow once a user logs onto a display workstation 140.

In another embodiment of the present invention, workflow access routine 212 does not provide access to a default image processing workflow until an identity of a user is authorized. Comparing a user's login/password combination to a list of authorized login/password combinations, for example, may authorize a user identity. However, a user identity may be authorized by any other manner known to those of skill in the art.

Once the default image processing workflow has been communicated to display workstation 140, display workstation 140 may apply the default image processing steps included in the default workflow. For example, a default image processing workflow may include one or more default steps similar to:

View No. 1:

Left viewport—Chest PA @ W/L preset #5,

Right viewport—Chest lateral facing left@W/L preset #5.

The term "View No. 1" indicates that the following steps are applied to the image data as it is initially presented to the user on display workstation 140. Subsequent views of the image data may be referred to as "View No. 2", "View No. 3", . . . "View No. N", for example.

The terms "Left viewport" and "Right viewport" indicate the portion of a display screen that is to be affected by the corresponding steps. For example, the step(s) following a "Left viewport" are to be applied to the left-half portion of a display screen on display workstation 140.

"Chest" is used to designate what patient anatomy is featured in the image data. Other terms may used to designate the featured anatomy. For example, "Chest" may be replaced with "Leg", "Arm", and so on.

"PA" (for example, posterior-anterior) and "lateral facing left" indicate what type of image is to be presented in each viewport. For example, the above default steps indicate that a PA image of a patient's chest is to be displayed in the left viewport on a display workstation 140. Similarly, the above steps indicate that a lateral image of a patient's chest is to be displayed in the right viewport and oriented so that the image is facing towards the left side of a display screen on display workstation 140.

The term "@ W/L preset #5" indicates the preset window and level setting of the corresponding image. For example, in both viewports, the images are to be displayed with the window/level set at levels associated with a preset indicated by the number 5. As appreciated by one of ordinary skill in the art, any number of terms may be used to designate the default image processing steps of a default image processing workflow. The above terms and steps are used merely as an example to describe an embodiment of the present invention.

Figure 3:
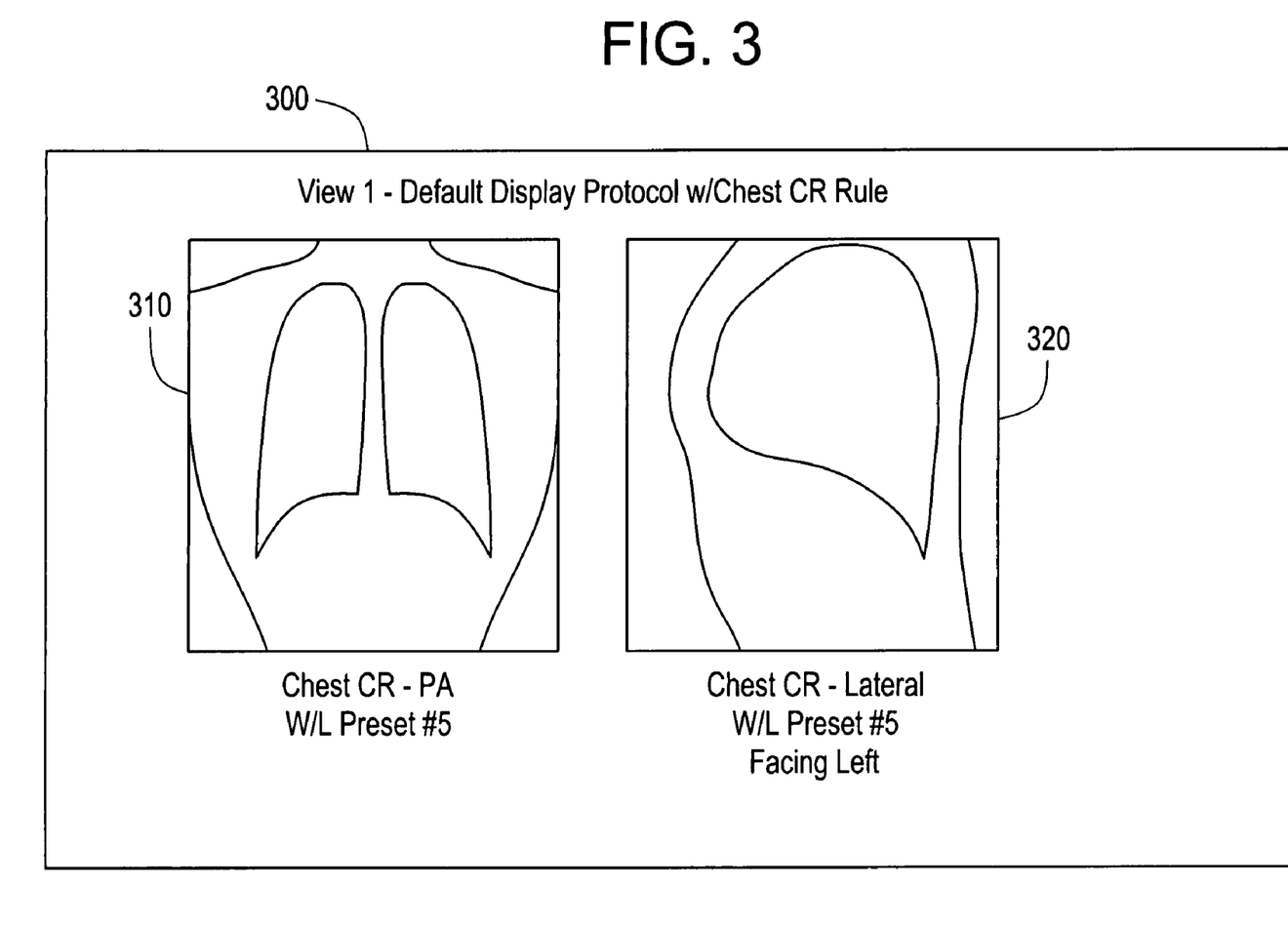
FIG. 3 illustrates a display of a first view of image data on a display workstation according to an embodiment of the present invention.

FIG. 3 illustrates a display 300 of a first view of image data on a display workstation 140 according to an embodiment of the present invention. Display 300 includes left and right viewports 310, 320. Each viewport 310, 320 has had the above default image processing step applied to image data. Thus, left viewport 310 includes a PA image of a patient's chest, with the window/level setting set at preset level number 5. Similarly, right viewport 320 includes a lateral image of a patient's chest oriented so that it is facing left, with the window/level setting set at preset level number 5.

As described above, a user may wish to apply additional processing steps to one or more images to further enhance features in the image. For example, a user may desire to apply additional processing functions or steps to an image in order to alter the presentation of an image in conformance with the user's confidence level for making an accurate diagnosis. In other words, different users may desire to apply different or additional processing steps than are included in a default image processing workflow.

The additional image processing step(s) may include any image processing step useful to prepare an image for a diagnostic examination. For example, as described above, an image processing step (as a default image processing step or an additional image processing step) can include flipping an image, zooming in an image, panning across an image, and altering one or more of a window, a level, a brightness and a contrast setting of an image.

A user may select additional processing steps in any manner known to those of skill in the art. For example, a user may use an input device to manually select a processing function. For example, a user may move a pointer displayed on display workstation 140 with a mouse or stylus to a location associated with a processing function. The user may then use the input device to activate the processing function. In another example, the user may use a keyboard to select a processing function by typing in a single keystroke or series of keystrokes associated with a processing function. In another example, the user may select a processing function through the use of a voice-recognition software application on display workstation 140.

Once a user has selected an additional processing function to be applied to image data, the processing function is applied to the image data. The additional processing function(s) may be stored on a memory 220 of server 130 and communicated to display workstation 140 when requested by a user.

In another embodiment of the present invention, the additional processing function(s) may be stored on a memory of display workstation 140 and applied to image data when requested by a user. In such an embodiment, a communication concerning the identity or type of processing function may be sent from workstation 140 to server 130.

Tracking routine or device 214 monitors the selection and/or application of one or more additional processing functions to image data. Tracking routine or device 214 may be embodied in a set of instructions stored on a computer-readable medium. For example, tracking routine or device 214 may be embodied in a software application stored at server 130.

In another embodiment of the present invention, tracking routine 214 can reside at workstation 140 and communication the selection of one or more additional processing steps to server 130.

Tracking routine 214 can monitor the selection and/or application of one or more additional processing functions to image data by monitoring manual input from a user. For example, tracking device 214 can monitor a number of times a user selects a particular processing function and/or the number of times a particular processing function is applied to image data at display workstation 140. In another example, tracking routine 214 may monitor a location on a display of display workstation 140 that an input device is used to select or invoke an additional image processing step. In other words, if a user employs a mouse to move an on-screen pointer over a graphical representation of an additional processing step and then clicks the mouse to select the processing step, tracking routine 214 can monitor the location. Based on a look-up table or other manner of associating an on-screen location with a graphical representation of a processing step, tracking routine 214 can then determine which processing step was selected.

In another embodiment of the present invention, tracking routine 214 can monitor the selection and/or application of one or more additional processing functions to several different sets of image data during a given time period. For example, tracking routine 214 may monitor the number of times a user selects a given processing function or step during a defined time period such as an 8 hour period or a time period defined by the user logging in and logging out of a display workstation.

In another embodiment of the present invention, tracking routine 214 can monitor the selection and/or application of one or more additional processing functions to image data of a certain type. A type of image data may be defined as one or more of image data obtained from the same or similar (for example, common) imaging modality, image data used for a same or similar diagnostic exam, image data associated with an anatomy to be examined, and image data examined by a particular user identity, for example. For example, tracking routine 214 may monitor the number of times a user selects a given processing function or sequence of functions for image data from the same imaging modality.

Tracking routine 214 may compare a user's selection(s) of processing step(s) to a threshold in order to determine whether the default image processing workflow should be modified. For example, tracking routine 214 may compare the number of times a user selects a particular processing function to a threshold. If the user selects the particular processing function a number of times that is greater than a threshold, tracking routine 214 may notify workflow modifying routine 216. Tracking routine 214 may compare the number of times the processing function is selected and/or the number of times the processing function is selected within a given time period or for image data of a certain type, as described above, for example.

In another example, tracking routine 214 may compare the number of times a user selects a particular sequence of processing functions to a threshold. If the user selects the same or similar sequence of functions a number of times that is greater than a threshold, tracking routine 214 may direct workflow modifying routine 216 to modify the default workflow.

In another example, tracking routine 214 may compare the number of times a user employs an input device to activate a graphical representation of a processing step at an on-screen location to a threshold. If the user uses the input device to activate the processing step at the same or similar on-screen location a number of times that is larger than a threshold, tracking routine 214 may notify workflow modifying routine 216. For example, tracking routine 214 may monitor or track where a user uses a mouse to move a graphical pointer on a computer screen.

In another embodiment of the present invention, tracking routine 214 may compare a user's selection(s) of processing step(s) to a plurality of thresholds in order to determine whether the default image processing workflow should be modified. For example, tracking routine 214 may monitor the number of times a single processing function is selected by a user in a given time period and a number of times a sequence of processing functions is selected by a user. Tracking routine 214 may then compare the number of times a single processing function is selected by a user in a given time period to a first threshold and a number of times a sequence of processing functions is selected by a user to a second threshold, for example. When either or both exceed the corresponding threshold, tracking routine 214 may notify workflow modifying routine 216 of a need to modify the default workflow.

In another embodiment of the present invention, one or more thresholds are global thresholds applicable to a group of users or to all users. That is, each user's selection of processing steps is compared to the same threshold in order to determine whether tracking routine 214 should notify workflow modifying routine 216, for example.

In another embodiment of the present invention, one or more thresholds are individually customizable thresholds. That is, each user may set his or her thresholds to a number or sequence length that he or she desires. In this way, each user has highly customizable control over when tracking routine 214 notifies workflow modifying routine 216.

In another embodiment of the present invention, one or more thresholds may be based on a user identity, an imaging modality from which the image data is obtained, a type of diagnostic exam, and an anatomy featured in the image. For example, thresholds may vary among different types of imaging modalities, users, diagnostic exams, and/or anatomies featured in images.

By monitoring a number of times a user selects the same or similar processing functions (or a sequence of processing functions) to be applied to image data (in addition to the processing functions of the default image processing workflow), tracking routine 214 is tracking rote, repetitive tasks that a user frequently selects. In other words, tracking routine 214 is monitoring when a user repeatedly applies the same or similar processing functions to image data that has already been processed according to the default image processing workflow. Tracking routine 214 thus monitors when a user is spending considerable amounts of time repeatedly selecting the same additional processing functions. As such, the present invention directs the default image processing routine to be modified so as to incorporate the repeated processing steps routinely selected by a given user.

The notification communicated from tracking routine 214 to workflow modifying routine 216 (when a number of times a processing function and/or a number of times a sequence of processing functions exceeds one or more thresholds) can include any communication sufficient to inform workflow modifying routine 216 that the default image processing routine needs to be modified. For example, tracking routine 214 may communicate an "EDIT" message to workflow modifying routine 216 with instructions on which processing functions need to be added to the default workflow or which processing functions of the default workflow need to be altered.

Once workflow modifying routine 216 receives a notification from tracking routine 214, workflow modifying routine 216 modifies or edits the default workflow. The workflow modifying routine 216 may modify the default image processing workflow in any manner known to those of skill in the art. For example, workflow modifying routine 216 may modify a default workflow by altering one or more processing steps, by adding at least one additional processing step to the default image processing workflow, and/or by adding a sequence of processing steps to the default workflow. For example, workflow modifying routine 216 may edit the default image processing workflow by adding a particular image processing step (frequently selected by a user) to the default image processing workflow. Similarly, workflow modifying routine 216 may edit the default image processing workflow by adding a sequence of image processing steps that is frequently selected by a user to the default image processing workflow. In general, processing functions in a default workflow and processing functions selected by a user (which are applied to image data after the processing functions of the default workflow are applied to the image data) may be the same functions. For example, a default workflow may include a processing step of zooming an image 200%. A user may then select an additional processing step that zooms into the image an additional 200%, for example.

In another example, workflow modifying routine 216 may edit the default image processing workflow by removing or altering a default image processing step (included in the default image processing workflow) that is frequently undone or corrected for by a user. In other words, a default image processing workflow may include the steps of zooming the left viewport by 200% followed by panning right 50%. If a user routinely follows the default image processing workflow by zooming −150% (for a net zoom of 50%) followed by panning left 50% (for a net panning of 0%), then workflow modifying routine 216 may edit the default image processing workflow to include steps of zooming 50% with no panning of the image, for example.

In another embodiment of the present invention, workflow modifying routine 216 obtains a user's permission before modifying a default image processing workflow. For example, workflow modifying routine 216 may communicate a query to a user asking for permission to modify a default image processing workflow. The query can be communicated between server 130 and display workstation 140, for example. The query can include a recommended modification to the default image processing workflow and a request for permission to edit the default image processing workflow, for example. The user then may grant or deny editing permission to workflow modifying routine 216. If the user grants editing permission, workflow modifying routine 216 then edits the default image processing workflow. If the user denies editing permission, workflow modifying routine 216 then does not edit the default image processing workflow.

In another embodiment of the present invention, workflow modifying routine 216 may ensure that any modification to a default image processing workflow complies with a regulatory requirement. For example, the Food and Drug Administration ("FDA") may require that a particular sequence of image processing steps always be applied to a certain type of image data. Workflow modifying routine 216 can reference a list of regulatory requirements for some or all default image processing workflows stored at server 130 to ensure that a modification to a default image processing workflow does not cause a modified default image processing workflow to violate any regulatory requirements. If the modified default image processing workflow does not violate any regulatory requirements, workflow modifying routine 216 then edits the default image processing workflow. If the modified default image processing workflow would violate one or more regulatory requirements, workflow modifying routine 216 then does not edit the default image processing workflow and may include a communication to a user notifying him or her of this violation.

After a default image processing workflow is modified, workflow modifying routine 216 communicates the modified default image processing workflow to memory 220. Thereafter, the modified default image processing workflow may be applied to applicable image data as a default image processing workflow. As such, the present invention provides for the continuous dynamic improvement of a default image processing workflow such that a default image processing workflow is continually updated to accommodate repeated processing steps selected by a user.

In another embodiment of the present invention, a modified default image processing workflow associated with a first user may be accessible to and used by at least one other user. For example, a first user may be an experienced radiologist. A second user may be a new, inexperienced radiologist. Any one or more of the modified default image processing workflows created by the experienced radiologist may be communicated from server 130 to a display workstation 140 for use by the inexperienced radiologist. As such, the inexperienced radiologist can learn from the modifications made to a default image processing workflow by the experienced radiologist.

Figure 4:
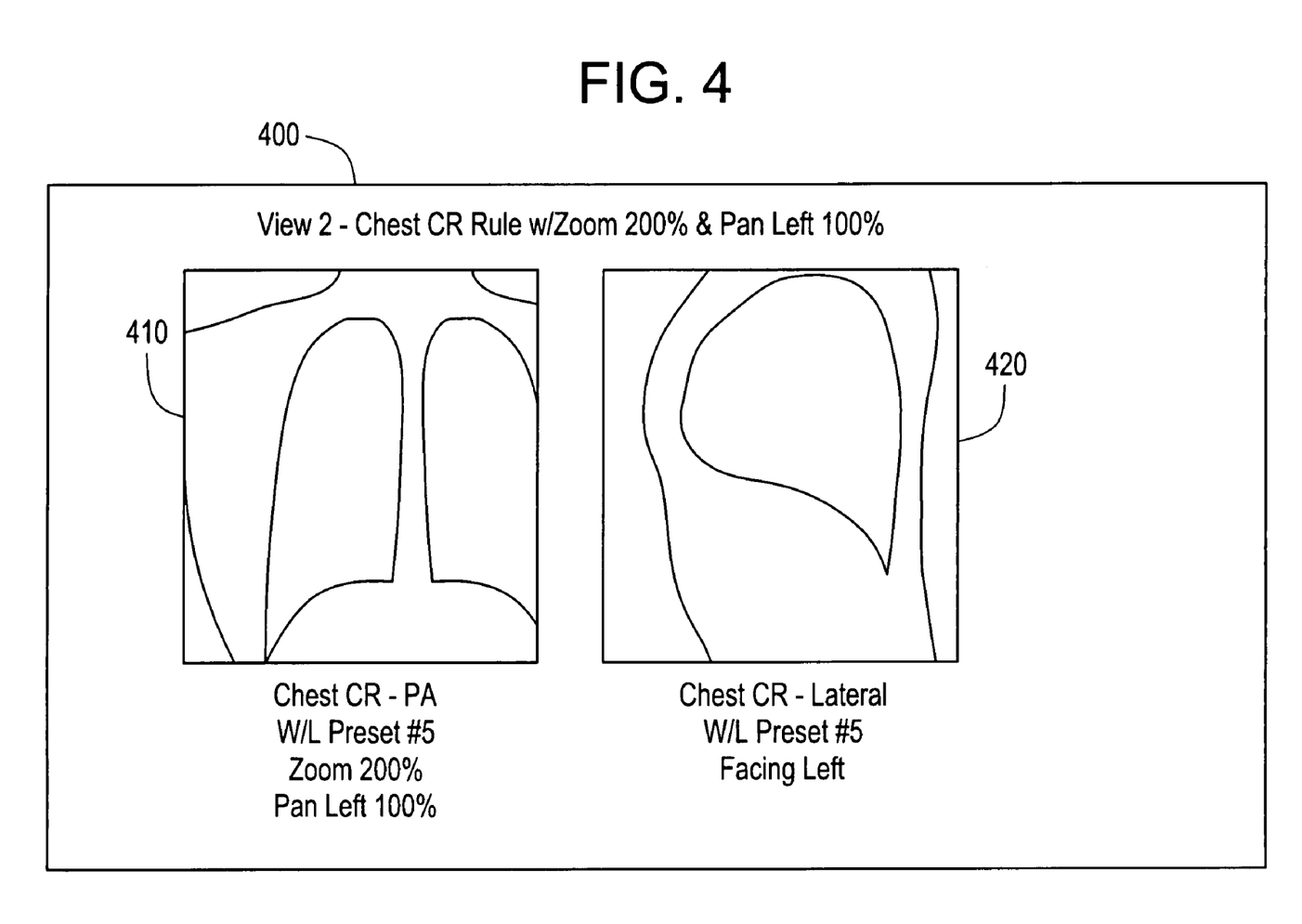
FIG. 4 illustrates a display of a second view of image data on a display workstation after a first set of additional processing functions have been selected by a user and applied to the image data, in accordance with an embodiment of the present invention.

The following example provides an exemplary application of the presently described system and method. As described above, FIG. 3 illustrates two viewports of images after a default image processing workflow has been applied to the images in accordance with an embodiment of the present invention. FIG. 4 illustrates a display 400 of a second view of image data on a display workstation 140 after a first set of additional processing functions have been selected by a user and applied to the image data, in accordance with an embodiment of the present invention. Display 400 includes left and right viewports 410, 420. Each viewport 410, 420 includes the same image data as viewports 310, 320 of FIG. 3 with additional processing steps selected by the user.

Left viewport 410 includes the image data of left viewport 310 of FIG. 3, with the additional processing steps of zooming 200% and panning left 100% in the image. If the user repeatedly selects these two additional processing steps, tracking routine 214 and/or workflow modifying routine 216 may determine that the default image processing workflow needs to be modified to incorporate these two additional processing steps. For example, workflow modifying routine 216 may desire to incorporate the following processing steps into the default image processing workflow:

View No. 2:
Left viewport—Chest PA @ W/L preset #5, zoom 200%, pan image port 100% left;
Right viewport—Chest lateral facing left @ W/L preset #5.

If workflow modifying routine 216 does incorporate the 200% zoom and 100% pan left processing steps into the default image processing workflow, then future image data appears as the images in viewports 410, 420 after the default image processing workflow has applied the modified default image processing steps to image data. As such, the user does not have to select the two additional processing steps to achieve the views of image data as shown in FIG. 4. Instead, the two processing steps previously manually selected by the user are incorporated into the default image processing workflow and are automatically applied to image data when the modified default image processing workflow is subsequently applied.

Figure 5:
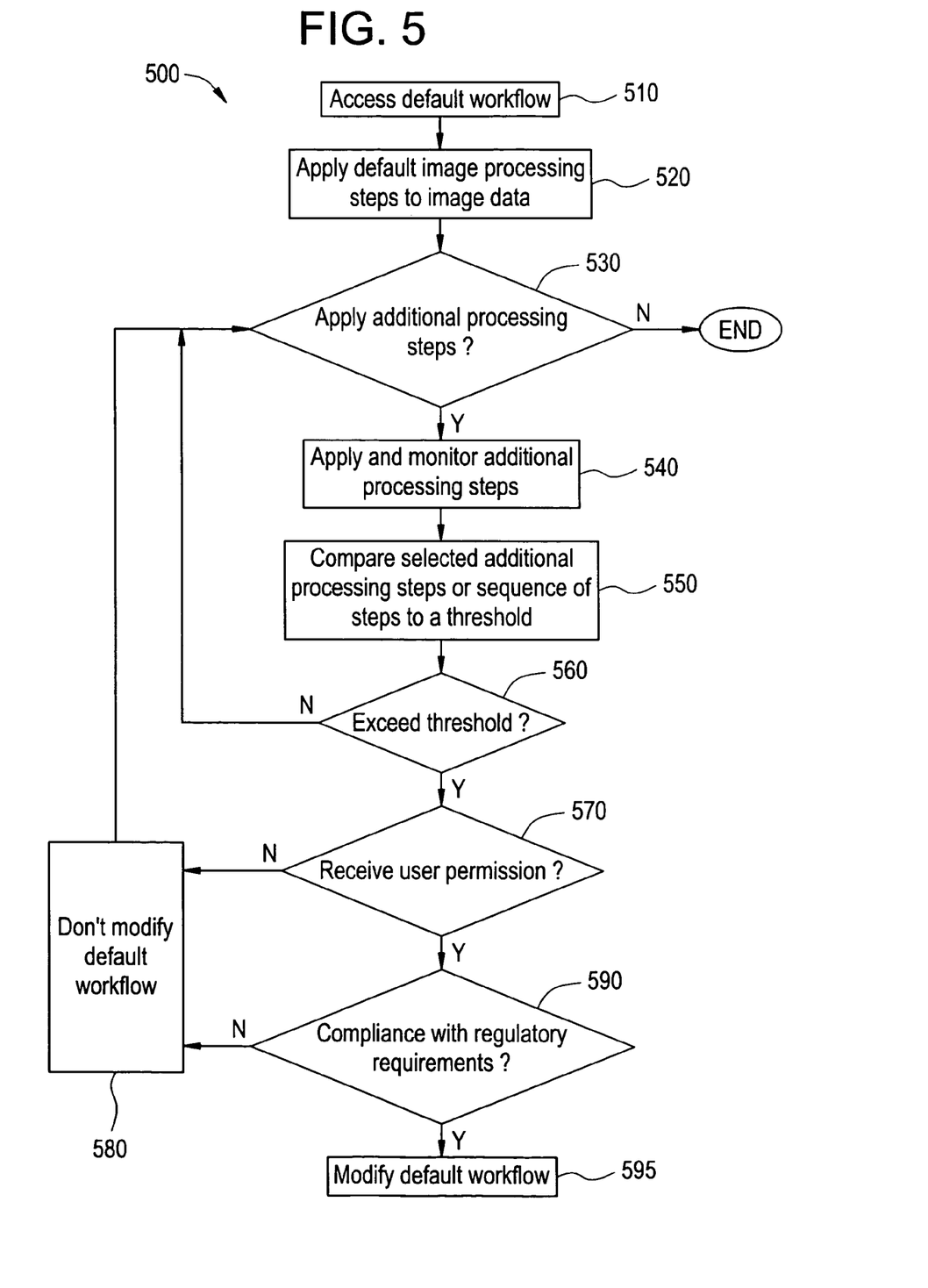
FIG. 5 illustrates a flowchart for a method for dynamically altering an image processing workflow in accordance with an embodiment of the present invention.

FIG. 5 illustrates a flowchart for a method 500 for dynamically altering an image processing workflow in accordance with an embodiment of the present invention. First, at step 510, a default image processing workflow is accessed, as described above. For example, a default image processing workflow may be communicated from memory 220 in server 130 to one or more display workstations 140.

Next, at step 520, the default image processing steps included in the default image processing workflow are applied to image data, as described above.

Next, at step 530, a determination is made whether additional processing steps are to be applied to the image data. In other words, method 500 determines, at step 530, whether processing steps in addition to those of the default image processing workflow are to be applied to the image data. If no additional processing steps are to be applied, the images are presented to a user at display workstation 140 and method 500 terminates.

If additional processing steps are to be applied, method 500 proceeds to step 540. At step 540, the additional processing steps are applied to the image data. In addition, the additional processing steps are monitored. As described above, a tracking routine or device 214 can track which processing steps are applied to the image data, for example. Also as described above, in another embodiment of the present invention, at step 540, additional processing steps selected by a user for a class of image data (defined by, for example, the imaging modality used to obtain the image data, the type of diagnostic examination to be performed on the image data, the anatomy featured in the image data, and/or the identity of the user accessing the image data) may be monitored. Additional processing steps may therefore be monitored not just for a singular set of image data, but also for all image data obtained by a particular imaging modality or accessed by a given user, for example.

Next, at step 550, the selected additional processing steps and/or sequences of additional processing steps are compared to one or more thresholds. As described above, the number of times a given processing function is selected or the number of times a sequence of processing functions is selected may be compared to one or more thresholds, for example.

Next, at step 560, method 500 determines whether the number of times a given processing function is selected or the number of times a sequence of processing functions is selected exceeds one or more thresholds. For example, if a given sequence of processing steps is selected by a user 21 times and is compared to a threshold of 20 times, then step 560 determines that at least one threshold has been exceeded. If the number of times a given processing function is selected or the number of times a sequence of processing functions is selected does not exceed one or more thresholds, then method 500 proceeds to step 530.

However, if it is determined that the number of times a given processing function is selected or the number of times a sequence of processing functions is selected exceeds one or more thresholds at step 560, then method 500 proceeds to step 570.

At step 570, a user is prompted for permission to modify the default image processing workflow, as described above. If the user denies permission, method 500 proceeds to step 580, where the default image processing workflow is not modified. Method 500 then proceeds to step 530.

However, if the user grants permission at step 570, then method 500 proceeds to step 590. At step 590, method 500 determines if the proposed modification to the default image processing workflow causes the default image processing workflow to violate or fail to comply with one or more regulatory requirements, as described above. If the proposed modification would cause such a violation, method 500 proceeds to step 580, where the default image processing workflow is not modified. Method 500 then proceeds to step 530.

However, if the proposed modification would not cause the default image processing workflow to violate a regulatory requirement, method 500 proceeds to step 595. At step 595, the default image processing workflow is modified in accordance with the proposed modification, as described above.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. A computer-readable storage medium including a set of instructions for a computer, said instructions including:
    an access routine communicating a default image processing workflow between a network server and a display workstation, said default image processing workflow including at least one default image processing step for preparing at least one image for presentation to a user at said display workstation;
    a tracking routine monitoring a selection of at least one additional image processing step to be applied to said image at said display workstation, wherein said tracking routine monitors repeated manual selection of said at least one additional image processing step to be applied to said image over time by a user; and
    a modifying routine modifying said default image processing workflow based on repeated manual selection of said at least one additional image processing step to be applied to said image over time by the user, wherein said modifying routine incorporates said repeated manual selection of said at least one additional image processing step to be applied to said image over time by the user into said default image processing workflow, wherein said modifying routine eliminates a need for further manual selection of said at least one additional image processing step with respect to said default image processing workflow.

2. The computer-readable storage medium of claim 1, wherein at least one of said default image processing step and said additional image processing step include one or more of:
    flipping said image;
    zooming in said image;
    panning across said image;
    altering at least one of a window and a level in a grayscale display of said image; and
    altering at least one of a contrast and a brightness of said image.

3. The computer-readable storage medium of claim 1, wherein at least one of said default image processing step and said additional image processing step are capable of presenting said image to said user for a diagnostic examination.

4. The computer-readable storage medium of claim 1, wherein said access routine is configured to select and communicate a particular default image processing workflow from a plurality of default image processing workflows based on one or more of:
    an imaging modality employed to obtain said image;
    a type of diagnostic exam to be performed on said image;
    an identity of said user; and
    an anatomy featured in said image.

5. The computer-readable storage medium of claim 1, wherein said access routine is configured to communicate said default image processing workflow to said display workstation through a network connection.

6. The computer-readable storage medium of claim 1, wherein said tracking routine is configured to monitor a number of times said additional processing step is selected and/or a number of times a sequence of a plurality of said additional processing steps is selected.

7. The computer-readable storage medium of claim 6, wherein said modifying routine is configured to modify said default image processing workflow after one or more of said number of times said additional processing step is selected and said number of times said sequence is selected exceeds one or more thresholds.

8. The computer-readable storage medium of claim 7, wherein said one or more thresholds is individually customizable.

9. The computer-readable storage medium of claim 1, wherein said modifying routine is configured to modify said default image processing workflow after said user is prompted for and provides permission to modify said default workflow.

10. The computer-readable storage medium of claim 1, wherein said modifying routine is configured to modify said default image processing workflow after ensuring that said default image processing workflow complies with at least one regulatory requirement after being modified.

11. The computer-readable storage medium of claim 1, wherein said modifying routine is configured to modify said default image processing workflow in order to create a modified default image processing workflow based on said selection of said at least one additional image processing step,
    wherein said access routine is configured to communicate said modified default workflow to at least one other user.

12. The computer-readable storage medium of claim 1, wherein said tracking routine is configured to monitor said selection of said at least one additional image processing step associated with one or more of:
    image data obtained using a common imaging modality;
    image data used for a common diagnostic exam;
    image data featuring a common anatomy; and
    image data said user.

13. A method for dynamically altering an image processing workflow, said method including:
    providing access to a default image processing workflow, said default image processing workflow including a plurality of image processing steps for presenting a medical image for a diagnostic examination;
    providing a tracking system monitoring a selection of one or more additional image processing steps by a user to be applied to said image;

monitoring, by the tracking system, repeated manual selection of said one or more additional image processing steps;

providing a workflow editor capable of dynamically creating a modified default image processing workflow, said modified default image processing workflow including said default image processing workflow and at least one modification to said default image processing workflow, said modification based on said repeated manual selection of said one or more additional image processing steps; and incorporating, through the workflow editor, said repeated manual selection of said one or more additional image processing steps into said default image processing workflow, wherein said incorporating eliminates a need for further manual selection of said one or more additional image processing steps with respect to said default image processing workflow.

14. The method of claim 13, wherein said step of providing access includes providing a set of instructions stored on a computer-readable storage medium capable of being communicated between a server and a display workstation.

15. The method of claim 13, wherein said step of providing access to said default image processing workflow selects a particular default image processing workflow from a plurality of said default image processing workflows, said selection of said particular default image processing workflow based on one or more of:
    an imaging modality from which said image was acquired;
    a type of diagnostic examination to be performed on said image;
    an identity of said user; and
    an anatomy featured in said image.

16. The method of claim 13, wherein said step of providing access includes providing access to said default image processing workflow after an identity of said user is authorized.

17. The method of claim 13, wherein said tracking system is capable of monitoring said selection by at least one of:
    monitoring a number of times said selection of said additional image processing step occurs; and
    monitoring a number of times a sequence of a plurality said additional image processing steps is selected.

18. The method of claim 17, wherein said workflow editor is capable of creating said modified default image processing workflow when said number of times said selection of said additional image processing step and/or said number of said sequence exceeds one or more thresholds.

19. The method of claim 17, wherein said modification includes one or more of:
    adding said at least one additional image processing step to said default image processing workflow;
    removing at least one of said image processing steps from said default image processing workflow; and
    adding said plurality of said additional image processing steps of said sequence to said default image processing workflow.

20. The method of claim 13, wherein said workflow editor is capable of creating said modified default workflow after at least one of receiving permission from a user and ensuring that said modified default image processing workflow complies with a regulatory requirement.

21. The method of claim 13, wherein said tracking system is capable of monitoring said selection of said one or more additional image processing steps according to one or more of:
    an imaging modality employed to obtain said image;
    a diagnostic exam to be performed on said image;
    an anatomy featured in said image; and
    image data accessed by said user.

22. A system for dynamically altering an image processing workflow, said system including:
    a default image processing workflow including a subset of a plurality of image processing steps, said image processing steps employed in presenting an image for a medical examination;
    a tracking system configured to monitor a user's selection of one or more of said plurality of image processing steps outside of said subset, said one or more image processing steps applied to said image after said subset of said image processing steps have been applied to said image, wherein said tracking system monitors repeated manual selection of said one or more of said plurality of image processing steps outside of said subset; and
    a workflow editor configured to modify said default image processing workflow to include one or more of said image processing steps outside of said subset selected by said user, wherein said workflow editor eliminates a need for further manual selection of said one or more of said plurality of image processing steps outside of said subset with respect to said default image processing workflow.

23. The system of claim 22, wherein said image processing steps include one or more of flipping said image, enlarging said image, panning across said image, altering one or more of a window and a level of said image, and altering one or more of a contrast and brightness of said image.

24. The system of claim 22, wherein said tracking system is configured to monitor one or more of a number of times said user selects a particular image processing step and a number of times said user selects a sequence of image processing steps.

25. The system of claim 24, wherein said workflow editor is configured to recommend at least one modification to said default image processing workflow based on one or more of said number of times said user selects said particular image processing step and said number of times said user selects said number of times said sequence of image processing steps is selected by said user.

26. The system of claim 25, wherein said image processing workflow editor is configured to modify said default image processing workflow after at least one of receiving permission from said user and ensuring that said modification does not violate a regulatory requirement.

27. The system of claim 22, wherein said tracking system is configured to monitor said selection as associated with one or more of:
    image data from a common imaging modality;
    image data employed in a common diagnostic exam;
    image data featuring a common anatomy; and
    image data accessed by said user.

* * * * *